INVENTORS.
Herman R. Craven
Karl D. Fastner

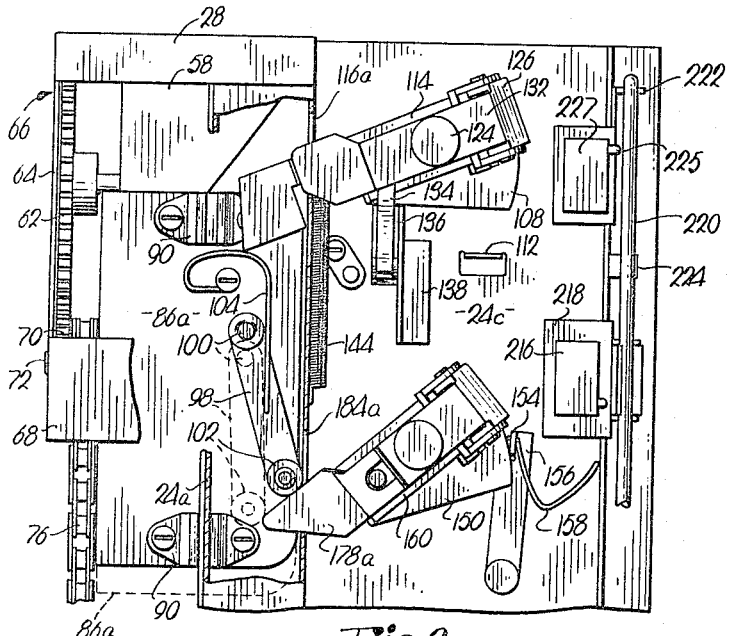
Fig.3.
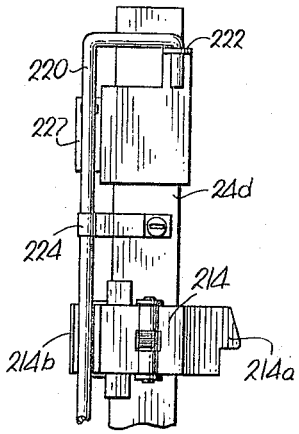
Fig.7.
Fig.18.
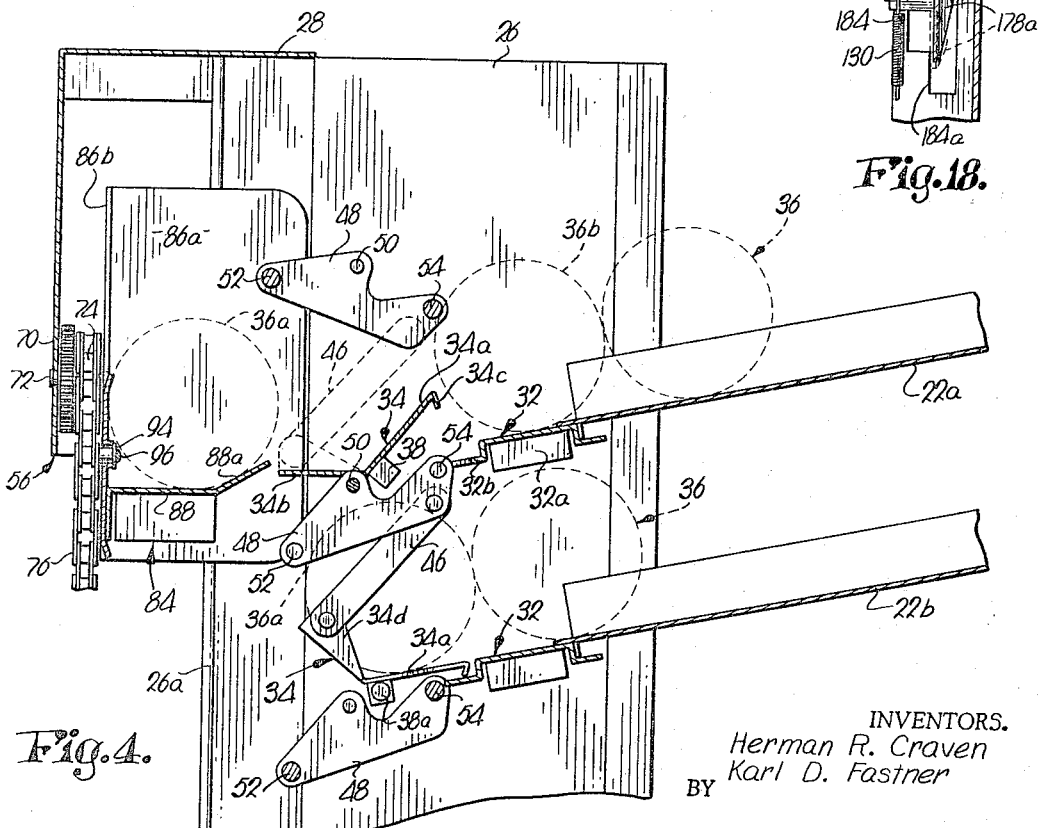
Fig.4.
INVENTORS.
Herman R. Craven
Karl D. Fastner
BY
ATTORNEYS.

June 13, 1967

H. R. CRAVEN ET AL 3,325,049

SELECTIVE SLANT SHELF VENDER HAVING
A PRODUCT DELIVERY CONVEYOR

Filed Aug. 27, 1965

INVENTORS.
Herman R. Craven
Karl D. Fastner

BY

Hovey, Schmidt, Johnson & Hovey
ATTORNEYS.

INVENTORS.
Herman R. Craven
Karl D. Fastner
BY
Hovey, Schmidt, Johnson & Hovey
ATTORNEYS.

June 13, 1967  H. R. CRAVEN ET AL  3,325,049
SELECTIVE SLANT SHELF VENDER HAVING
A PRODUCT DELIVERY CONVEYOR
Filed Aug. 27, 1965  6 Sheets-Sheet 6
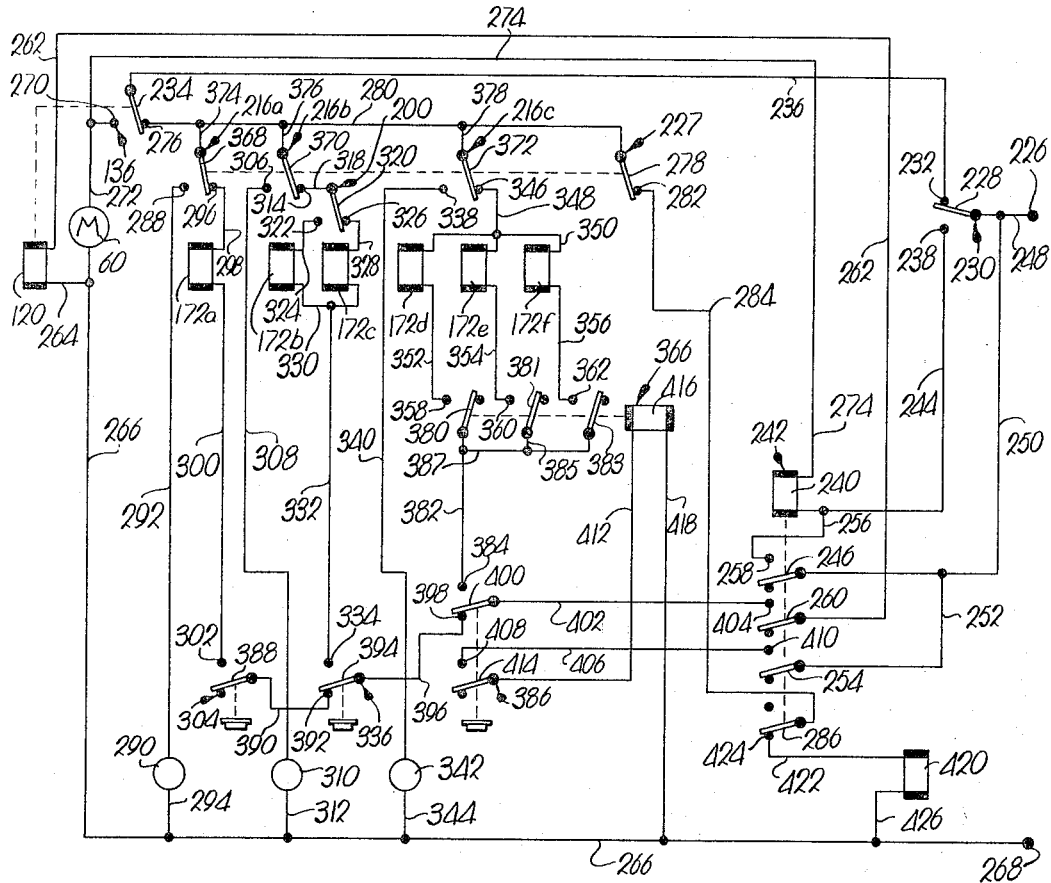
Fig.13.
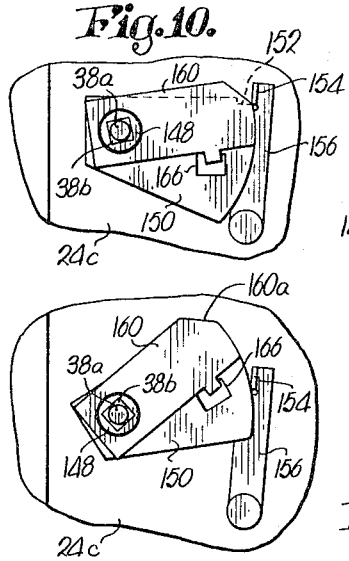
Fig.10.
Fig.11.
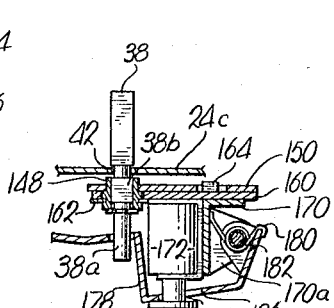
Fig.9.
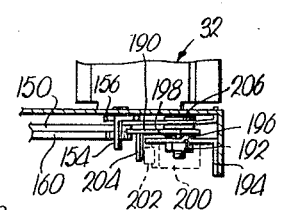
Fig.12.
INVENTORS.
Herman R. Craven
Karl D. Fastner
BY
Hovey, Schmidt, Johnson & Hovey
ATTORNEYS.

3,325,049
SELECTIVE SLANT SHELF VENDER HAVING A PRODUCT DELIVERY CONVEYOR

Herman R. Craven, Prairie Village, Kans., and Karl D. Fastner, Kansas City, Mo., assignors to The Vendo Company, Kansas City, Mo., a corporation of Missouri
Filed Aug. 27, 1965, Ser. No. 483,110
21 Claims. (Cl. 221—6)

This invention relates to machines for dispensing products, and especially to a product vending machine capable of handling a variety of different products for selection by the customer while at the same time providing automatic delivery of a selected product to a central discharge area.

Present commercial vending machines of the type adapted to dispense a variety of different products through individual control gates therefor, and wherein the products are of the type permitting successive gravitational delivery of the individual articles to the dispensing gates, have for the most part been either of the vertical product compartment design or a series of vertically disposed control gates operably associated with a vertical stack of spaced, inclined shelves wherein products on the individual shelves may successively roll toward corresponding control gates for delivery therefrom. The so-called "slant shelf" machines have an advantage over the vertical column machines in that a greater variety of different product selections can be offered as compared with a vertical column machine of the same approximate cabinet size. However, vertical column vending machines have achieved a great deal of popularity because of the simple and effective control mechanism which may be provided on machines of this type for automatic delivery of the customer's selections to a central discharge area. In the case of slant shelf vending machines, all prior machines of this general type have required either direct customer removal of a selected product from the discharge area for each corresponding shelf, or in the alternative, manual actuation of a product removal device operably associated with each control gate and located at the level of the selected product shelf.

It is therefore the primary object of the present invention to provide a product dispensing machine of the slant shelf type having unique mechanism in association with the individual control gates providing automatic delivery of a selected product to the customer at a central discharge area, thus providing automatic product delivery in association with desired product variety.

Although slant shelf machines as described above do offer the advantage of providing a number of product shelves suitable for receiving different varieties of the product to be dispensed, this additional availability of shelves for different products presents problems in and of itself. For example, since the machine is capable of accommodating different varieties of products, it is more difficult for one particular product supplier to control the amount of space which he has available for his product in any particular machine. Referring specifically to the vending of bottled beverages, for which the present invention has greatest utility, it can be seen that it is difficult for one bottler to preclude his competition from filling up all available shelves with his product, particularly in view of the fact that the same types of product need not be disposed on a particular shelf, and each deliveryman has access to the entire interior of the cabinet, even though deliveries by different bottlers will be made at different times. This problem is particularly acute from the standpoint that many machines are not in fact owned by the owner of the premises on which the machine is stationed, and the bottler or distributing agent owns a number of machines and places them on location under an arrangement whereby the owner of the machine and the owner of the premises share the profits of sales from the machines. Under these circumstances, it is desirable that some means be provided for assuring the owner of a particular machine that he will have a predetermined number of shelves available for his product in each machine, even though other varieties of bottled beverages may also be vended from the same machine, thereby providing the desirable product variety. It can be recognized in this respect that the bottler or owner of the machine frequently must provide some incentive to the location for accepting a machine on the premises, and this incentive can frequently be the provision of a machine capable of vending various flavors of beverages, thereby making the unit of greater appeal to prospective customers.

It is therefore another very important object of the invention to provide a vending machine of the slant shelf type, capable of effecting automatic delivery of a selected product to the customer, but at the same time incorporating novel mechanism wherein control is maintained over the products which may be dispensed from one or more shelves of the machine so that required control may be had over sale of products from certain selected shelves.

Another recent problem which has been presented to manufacturers of packaged beverage vending machines relates to the different types of containers used by different processors and bottlers for their products. Glass bottles of the return type were initially used by most bottlers since they were relatively inexpensive, had a relatively long life, and provided a desirable display of the beverage to the consumer. However, in recent years, other types of packages have been introduced at prices nearly competitive to returnable glass bottles, and especially those of the metal can and disposable glass bottle type. Insofar as cans are concerned, they present a problem to manufacturers of packaged beverage vending machines because they are for the most part of a different diameter than glass bottles. Disposable glass bottles present a particular problem in that the walls of the glass are substantially thinner than returnable bottles, and therefore must be handled more carefully during the dispensing operation. It is not possible to drop the disposable bottles a substantial distance, especially when it is appreciated that they are filled with a relatively heavy material. For this reason, it is incumbent upon packaged beverage vending machine manufacturers to provide machines which are capable, without substantial modification thereof, of vending returnable glass bottles, cans and disposable glass bottles at any desired time.

It is therefore a further very significant object of the present invention to provide a vending machine of the slant shelf type which is provided with novel product release and delivery mechanism capable of handling returnable bottles, cans and disposable glass bottles without modification of the control mechanism.

In this respect, it is another important object of the invention to provide a machine of the subject class which is capable of vending products of varying diameter without adjustment of the release and delivery mechanism, thereby making it possible for the owner of the machine to vary the varieties dispensed from the machine depending upon the customer demand, product availability and economic factors.

It is also a very important object of the invention to provide a modified machine embodying the concepts of the present invention especially adapted for delivery of products from shelves located in side-by-side relationship, thereby effecting economies in cabinet space needed for selected product capacity, and which would be impossible in slant shelf vending machines of the type where in

3 manual removal of products from selected dispensing areas was necessary.

Other objects and advantages of the present invention will become obvious or be explained in greater detail hereinafter.

In the drawings:

FIG. 3 is a fragmentary front elevational view of a portion of the mechanism illustrated in FIG. 1, and illustrating the release mechanism of the uppermost shelf in an operated position with the master control also being shown in its operated location;

FIG. 4 is a fragmentary vertical section through the upper portion of the mechanism and illustrating the two upper inclined product support shelves, the tiltable product delivery tables associated with respective support shelves, with one of the tables being illustrated in the tilted position thereof for effecting delivery of a product to the product conveyor of the machine;

FIG. 7 is a fragmentary end elevational view of the upper right-hand portion of the mechanism illustrated in FIG. 1, looking toward the structure from the right side of FIG. 1, and illustrating the two uppermost sold-out units associated with the upper product support shelf;

FIG. 9 is a fragmentary horizontal section through the release mechanism illustrated in FIG. 8 and taken on a line somewhat below the sectional line of FIG. 8 to illustrate the structure for mounting the respective release mechanism on the support frames of the machine;

FIG. 10 is a fragmentary front elevational view of the release mechanism for one of the tiltable tables for a corresponding product support shelf, and with the associated solenoid and swingable arm controlled thereby removed to more clearly illustrate the rotatable plate members and latch therefor, controlling rotation of a respective table;

FIG. 11 is a fragmentary front elevational view similar to FIG. 10, but showing the plates in an actuated position whereby the table associated therewith is permitted to rotate into disposition best shown in FIG. 4;

FIG. 12 is a fragmentary horizontal cross-sectional view taken substantially on the line 12—12 of FIG. 1 and looking downwardly to show details of the mechanical mechanism controlling alternate release of products from the two product shelves referred to above with respect to FIG. 1;

FIG. 13 is a schematic representation of a control circuit for the present machine and representing a simplified version thereof for exemplary purposes only;

FIG. 18 is a fragmentary cross-sectional view substantially on the line 18—18 of FIG. 8.

Figure 1:
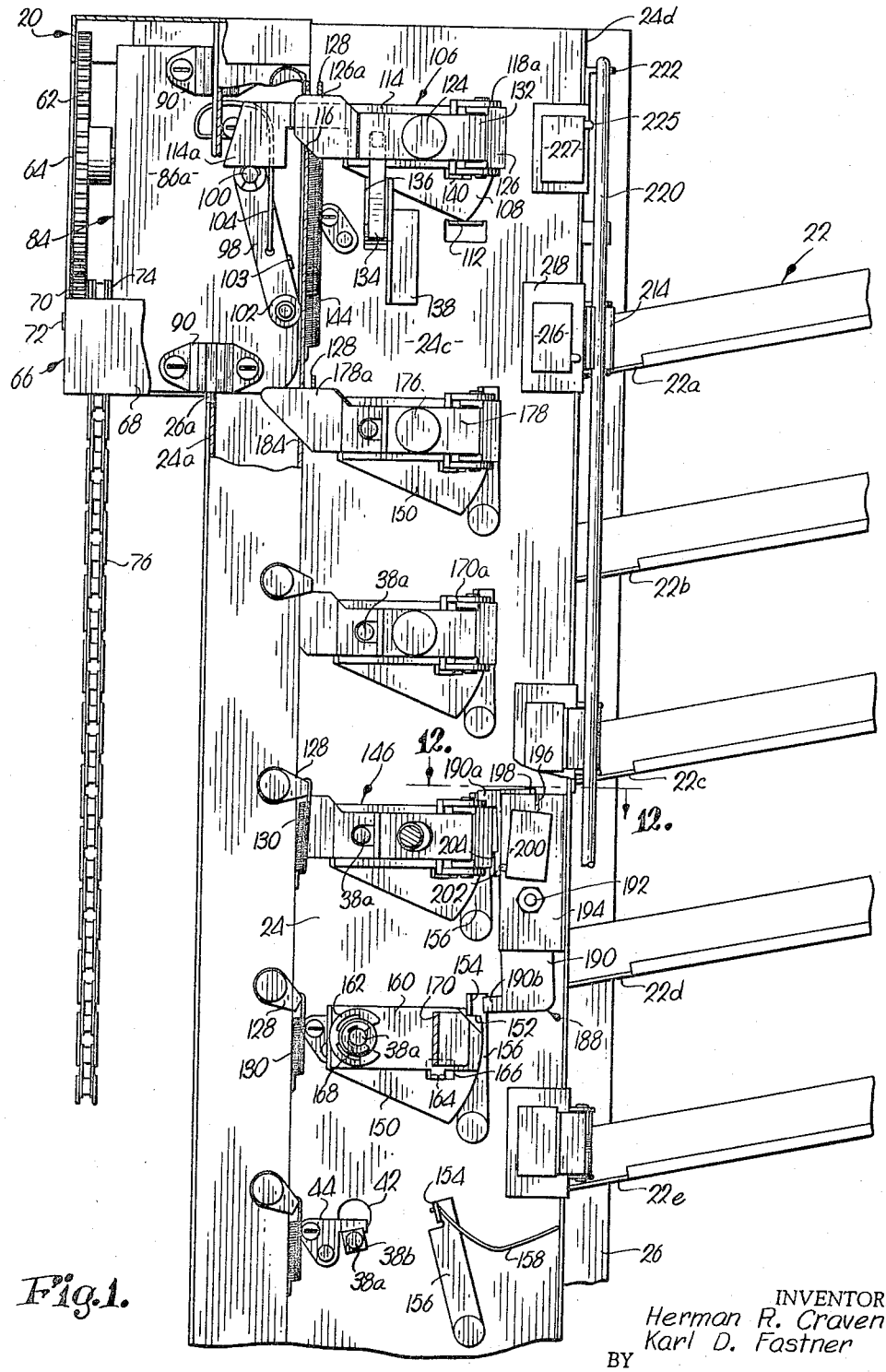
FIGURE 1 is a fragmentary front elevational view of a preferred form of slant shelf product dispensing machine embodying the present invention and illustrating two shelves having independently operable product release means in association therewith, along with two shelves having mechanically coupled release mechanism therewith for alternate release of products from such shelves.

Product support and release mechanism constructed in accordance with the preferred concepts of the present invention and adapted to be mounted within a suitable cabinet therefor, is broadly designated by the numeral 20 and includes a series of spaced, vertically stacked, inclined product support shelves broadly designated 22 and which are carried within the vending machine cabinet by suitable framework (not shown). The uppermost product shelf is designated 22a and by successive letter designations as the lowermost end of the mechanism 20 is approached, and in this respect it is to be understood that as many shelves 22 may be provided as desired depending upon the vertical space available in the cabinet of the vending machine, and the height of individual products to be accommodate on the various support shelves. The particular shelves illustrated in the drawings are especially suitable for receiving packaged beverages in throwaway bottles, cans or returnable glass bottles, but it is to be appreciated that the shelves are shown in representative form only and that other shelf constructions may be provided to accommodate different types of articles provided such articles will gravitate toward the lowermost or discharge extremities of each of the shelves 22.

A pair of normally upright, transversely irregular, parallel, main frame members 24 and 26 are interconnected by a top plate 28 and a bottom plate 30. As is apparent in FIGS. 2 and 5, the plates 28 and 30 have integral, downturned and upturned flange portions respectively which are suitably connected as by welding to the corresponding upper and lower extremities of main frame members 24 and 26. A series of horizontal, vertically spaced and aligned support channels 32 also span the distance between opposed faces of frame members 24 and 26, with one channel 32 being provided for each of the shelves 22 and disposed to support the normally lowermost, horizontally extending extremity thereof, as illustrated in FIG. 4. Integral, downturned flange portions 32a of each of the channels 32 are suitably welded to the inner faces of frame members 24 and 26. The generally L-shaped, lowermost leg portion 32b of each channel 32 is of particular interest, because this section thereof defines a stop for a corresponding table 34 tiltable about respective horizontal axes as will be explained hereinafter. However, viewing FIG. 4, it can be seen that each of the tables 34 has an innermost leg section 34a and an outer leg section 34b which are located at an obtuse angle with respect to each other and extend substantially the full width of the distance between main frame members 24 and 26. A downturned lip 34c on the rearmost extremity of each of the leg portions 34a is of a width substantially equal to the offset of leg portion 32b of a corresponding channel 32 whereby when each table 34 is in the normal standby position thereof as shown in the lower portion of FIG. 4, the upper surface of leg portion 34a is generally coplanar with the upper surface of the aligned channel 32. In the standby position of each of the tables 34 as shown in FIG. 4, products to be dispensed such as the beverage containers 36, are supported by a corresponding shelf 22 as well as table 34, with the lowermost, next to vend bottle or can 36a resting against respective leg portion 34b with the latter being located at an acute angle with respect to the horizontal.

The structure for mounting each of the tables 34 on main frames 24 and 26 for rotation about corresponding horizontal axes, includes a pair of shafts 38 and 40 (FIG. 2) secured to the underside of leg portion 34a of a corresponding table 34 adjacent the zone of merger of a respective leg portion 34a with the leg portion 34b thereof, as illustrated in FIG. 4, and each provided with cylindrical segments 38a and 40a respectively thereon which extend through suitable apertures provided therefor in main frames 24 and 26. One of the openings for receiving the cylindrical portion 38a of shaft 38 is illustrated in FIG. 1, and designated by the numeral 42. The vertically aligned openings 42 in the main frame member 24 have aligned counterparts in main frame member 26, with the retainers 44 in association with each of the openings 42, serving to maintain the cylindrical portions of shafts 38 and 40 within the narrow sections of the keyhole openings 42.

Each of the tables 34 is also provided with upturned, integral ears 34d on opposed end extremities thereof, which serve as means for pivotal connection of respective links 46 which are also pivotally joined to connector plates 48 pivotal about pins 50 on each of the main frames 24 and 26. A pair of rods 52 and 54 interconnect each pair of horizontally aligned connector plates 48 on opposite sides of the axes of pins 50 for cooperation with a respective table 34 therebelow to present a clamshell release gate for products 36 supported by an aligned shelf 22. It is to be noted that in the normal standby positions of connector plates 48 and the rods 52 and 54 thereon, as well as a table 34 therebelow, the vertical distance between the uppermost edge of leg portion 34b and the adjacent rod 52 is insufficient to clear the lowermost product 36a, whereas the vertical spacing between the leg portion 34a of table 34 and the rearmost rod 54 is sufficient to clear the product. Just the reverse is true upon tilting of table 34 as evident in FIG. 4 with respect to the uppermost clamshell release gate structure and associated shelf 22a.

Figure 2:
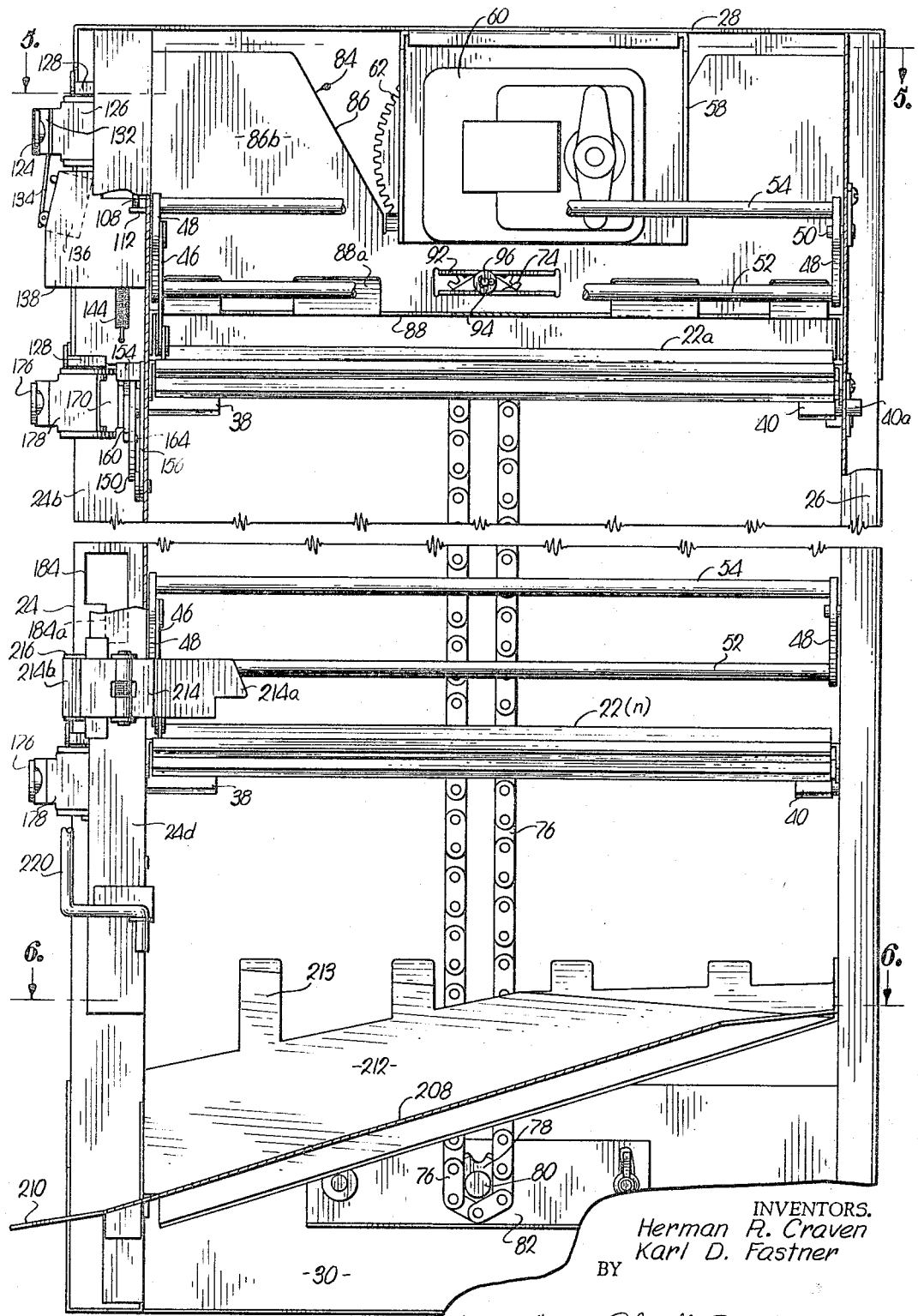
FIG. 2 is a fragmentary side elevational view of the mechanism illustrated in FIG. 1 and looking at the structure from the right-hand side of FIG. 1.
Figure 5:
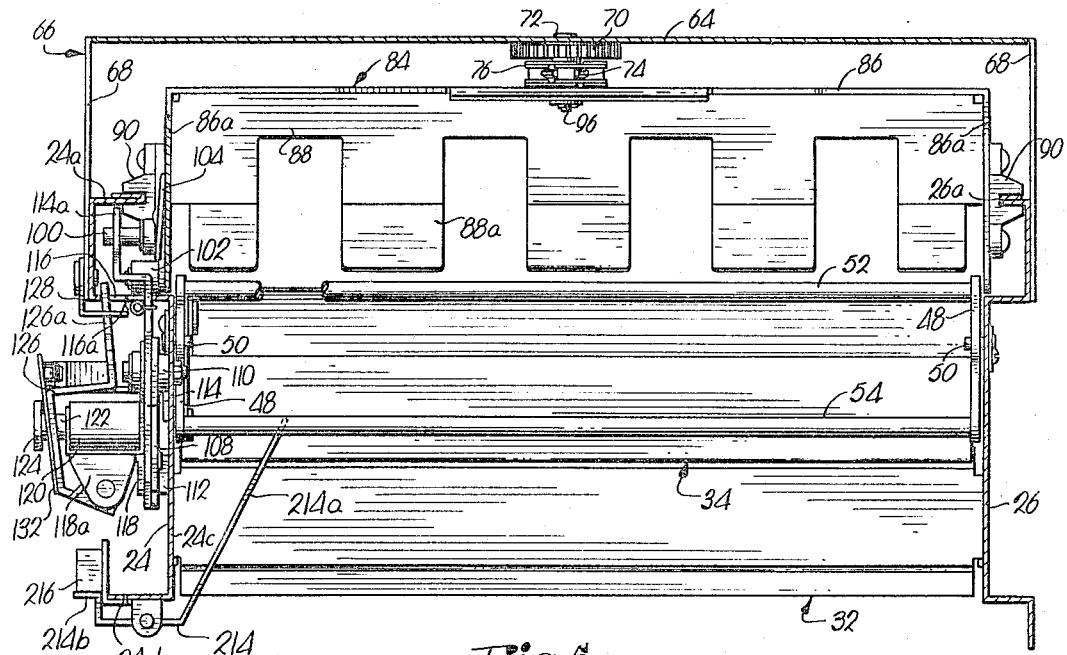
FIG. 5 is a fragmentary horizontal cross-sectional view through the product conveyor and the uppermost tiltable table and release mechanism associated therewith, and taken substantially on the line 5—5 of FIG. 2 and looking downwardly in the direction of the arrows.

Product conveying means broadly designated 56 is provided in association with support shelves 22 and the tables 34, for receiving a product 36 therefrom upon tilting of one of the tables and to thereafter deliver the product to a central discharge area or chute conveniently available to the customer. Conveying means 56 includes bracket 58 suspended from top plate 28 and serving to mount an electric motor 60 having an output shaft coupled to the relatively large spur gear 62 (FIG. 1) adjacent upright wall 64 of gear enclosure and support bracket 66 having sections 68 extending toward and joined to main frame members 24 and 26 as illustrated in FIGS. 1 and 5. The large spur gear 62 is in operable meshing relationship with a substantially smaller spur gear 70 carried by wall 64 located substantially equidistantly between main frame members 24 and 26. The shaft 72 supporting spur gear 70 in turn carries a sprocket 74 (FIG. 5) receiving an endless link belt chain 76 which is also trained over an idler 78 rotatable about shaft 80 carried by bracket 82 on the bottom plate 30 (FIG. 2).

The product elevator itself is broadly designated by the numeral 84 in FIGS. 1, 2, 5 and 6 and includes a generally U-shaped member 86 vertically reciprocable along the length of chain 76, and serving as means for supporting a generally horizontal product support plate 88 having a series of fingers 88a projecting toward the shelves 22. Transversely U-shaped guide shoes 90 carried by the outer faces of the parallel, inturned leg portions 86a of member 86, complementally receive the inturned flanges 24a and 26a of main frame members 24 and 26 respectively, to limit elevator 84 to a vertical path of travel. The main wall 86b of member 86 has a trapezoidal-shaped cutout in the upper margin thereof for clearing the drive shafts associated with motor 60, as well as a horizontal, elongated, centrally disposed slot 92 above plate member 88 for receiving a roller 94 carried by a pin 96 secured to link chain 76. Thus, during operation of motor 60 to rotate sprocket 74, elevator 84 will be raised and lowered as the roller 94 and associated pin 96 shift in slot 92 when the same pass around the sprockets 74 and 78 respectively.

Arm 98 (FIG. 1) pivotally mounted on the outermost face of the leg portion 86a of elevator 84 adjacent main frame member 24, is mounted for rotation about the uppermost extremity thereof through pivot pin 100 and carries a roller 102 on the lower extremity thereof projecting away from leg portion 86a and normally biased into engagement with a stop 103 on leg portion 86a of member 86 by spring 104 on the leg portion 86a and engaging arm 98.

Releasable mechanism is provided at the top of the article release structure adjacent motor 60, as well as in association with each of the tables 34, for causing only one product to be dispensed during each cycle of operation of the mechanism and upon proper customer deposit, while at the same time permitting selection of any one of a number of different products located on the various support shelves 22. The uppermost master control mechanism broadly designated 106 which is common to all of the shelves 22 is solenoid actuated and operates as a voltage divider with the solenoid actuated release mechanisms therebelow while also controlling operation of the product conveying means 56.

Control mechanism 106 includes a first plate 108 rotatably carried by pivot structure 110 on the main panel portion 24c of main frame member 24, and normally rests against a horizontal stop 112 projecting from panel portion 24c. A second plate 114 is also pivotally carried by structure 110 outboard of plate 108 and is provided with a generally L-shaped extension 114a thereon which projects through an inverted L-shaped opening 116 therefor in wall portion 24b of main frame member 24. Bracket 118 carried by the outwardly facing surface of second plate 114 mounts a solenoid 120 having a shiftable armature 122 projecting outwardly therefrom and provided with an enlarged head 124 on the outermost extremity of the same. An irregularly shaped operating member 126 pivotally mounted on vertically spaced ears 118a of bracket 118, is provided with an aperture therethrough clearing armature 122, but not the head 124 thereof, and has an outer, generally L-shaped extremity with the outermost leg portion 126a thereof positioned to be received within the L-shaped opening 116. The configuration of opening 116 is similar to the inverted L-shaped opening illustrated in wall portion 24b of main frame member 24, as shown in FIG. 2.

The generally L-shaped retainer 128 carried by main frame member 24 adjacent the outermost corner of wall portion 24b thereof, is normally biased downwardly into engagement with such corner by spring 130 and overlies leg portion 114a of second plate 114 as illustrated in FIG. 5. It is to be noted from this figure that the innermost extremity of retainer 128 is substantially aligned with the vertical segment 116a of opening 116. Therefore, when the operating member 126 is pivoted upon actuation of solenoid 120, the retainer 128 is pulled downwardly by spring 130 so that the outermost extremity of retainer 128 engages the outer face of leg portion 114a of second plate 114, to retain the latter in disposition where leg portion 114a may move downwardly into the segment 116a of opening 116.

A plate 132 on operating member 126 is positioned to engage the switch actuator 134 of a sensing switch 136 carried by bracket 138 on main panel portion 24c of frame member 24. As is apparent from FIG. 5, pivoting of plate 114 upon energization of solenoid 120 as explained above, causes the plate 132 to swing switch actuator 134 toward panel portion 24c of main frame member 24, thereby effecting a change in the contacts of switch 136. It is also to be particularly noted in FIG. 1 for example, that the pin 100 is of sufficient length to project outwardly into the path of travel of leg portion 114a of second plate 114, with the plate 114 resting on pin 100 in the normal standby positions of the components.

The plate 108 is provided with an aperture 140 therein which receives a projection 142 integral with the plate 114. Spring 144 coupled to plate 114 and panel portion 24c of main frame member 24, biases the plate 114 for pivoting movement in a counterclockwise direction viewing FIG. 3, thus causing plate 108 to be rotated with plate 114 by virtue of engagement of projection 142 with plate 108.

The release mechanism broadly designated 146 associated with each of the shelves 22 are of identical construction and therefore only one of the same will be described in detail, with it being understood that except where noted, the components of the other release mechanisms are identical in construction and operation. Referring initially to FIGS. 1, 4, 8 and 9, it is to be seen that the shaft 38 of the corresponding table 34, has a second square section 38b intermediate the ends of cylindrical portion 38a thereof and which is outboard of the main panel portion 24c of main frame member 24. The square section 38b explains the necessity for corresponding keyhole openings 42 in main frame member 24. Collar 148 around square section 38b of shaft 38 has a square opening therein for complementally receiving square section 38b of the respective shaft 38, with a first plate 150 being mounted on and carried by collar 148 for rotation of shaft 38 in response to pivoting movement of the plate 150. It is to be noted that the peripheral configuration of plate 150 is similar to plate 108, although plate 150 is provided with a cutout 152 which is adapted to receive the tab 154 of a latch 156 pivotally mounted in a generally upright disposition in underlying relationship to plate 150 in the space between the back face thereof, and the forward surface of panel portion 24c of main frame member 24. Leaf spring 158 engages the respective latch 156 to bias the same toward plate 150 and thereby into the cutout 152 as illustrated in FIG. 1.

A second plate 160 is pivotally mounted on collar 148 in overlying relationship to plate 150, and is held in place by an E-ring 162. Thus, plate 160 is rotatable with respect to plate 150. However, the plate 160 is provided with an integral, inwardly projecting tab 164 on the lower edge thereof which is received within an aperture 166 in plate 150. As evident from FIGS. 1, 10 and 11, the aperture 166 is of greater dimensions than tab 164 to provide for a certain degree of lost motion between plates 150 and 160. Plate 160 is provided with an inclined cam surface 160a thereon which is disposed to operably engage tab 154 of the associated latch 156 as shown in FIG. 10, to effect displacement of tab 154 from the corresponding cutout 152 in plate 150, when plate 160 is rotated in a counterclockwise direction viewing FIG. 10, as will be explained. Also, a second E-ring 168 on cylindrical portion 38a of shaft 38 operates to retain collar 148 on square segment 38b of shaft 38.

Bracket 170 on the outer face of plate 160 serves as means for mounting solenoid 172 having a shiftable armature 174 which is also provided with an enlarged head 176 on the outer extremity thereof. Ears 170a on bracket 170 pivotally carry an irregularly configured operating member 178 similar to the operating member 126 previously described. Coil spring 180 around the pivot pin 182 between ears 170a and rotatably carrying operating member 178, serves to bias the outer extremity thereof away from plates 150 and 160. Although not previously described, since it is not directly shown in the drawings, it is to be understood that a spring similar to spring 180 is provided on the pivot pin for operating member 126 for likewise biasing the same away from plates 108 and 114.

The outermost extremity or leg portion 178a of operating member 178 is positioned to extend through the inverted L-shaped opening 184 therefor in wall portion 24b of main frame member 24, and which is of configuration similar to the opening 116 previously described. Thus, as is evident from FIG. 2, each of the openings 184 has a vertical segment 184a which extends downwardly from the main part of the opening. Thus, in the normal standby position of operation member 178, the leg portion 178a thereof is out of alignment with the vertical segment 184a of the corresponding opening 184. It is to be also noted that the operating member 178 has an aperture 186 therein for clearing the armature 174 of solenoid 172, but not the head 176 thereof, so that upon energization of the coil of solenoid 172, the armature 174 is retracted to thereby swing the operating member 178 inwardly and bring the leg portion 178a thereof into alignment with vertical section 184a of the corresponding opening 184 and against the action of coil spring 180.

Figure 8:
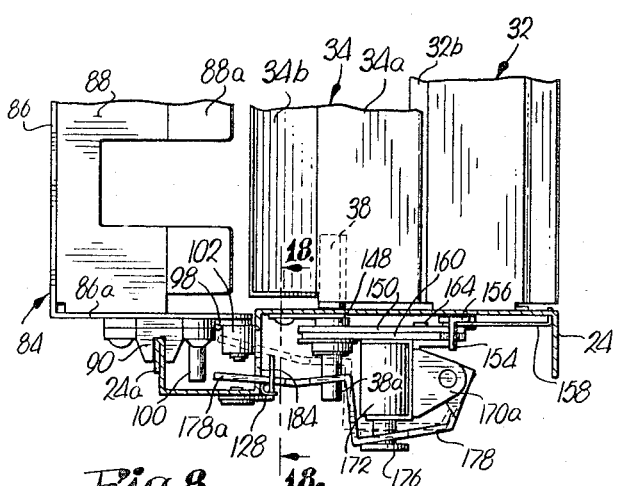
FIG. 8 is a fragmentary horizontal section taken substantially on an irregular line above the tiltable table and release mechanism therefor associated with the uppermost product support shelf, and with the operated position of the latch arm adapted to be actuated by the conveyor during movement thereof being illustrated in dotted lines.

A retainer 128 is provided for each of the release mechanisms 146 and as best illustrated in FIGS. 8 and 18, is operable to maintain operating member 178 in the actuated position thereof, upon energization of the respective solenoid 172, even though the coil thereof is energized only momentarily, until the entire release mechanism 146 has been rotated as will be explained.

It is now to be observed from FIGS. 1 and 8 that when the operating member 178 of one of the release mechanisms 146 is swung inwardly to the dotted line position thereof as shown in FIG. 8, the leg portion 178a of the actuated member 178 is within the path of travel of roller 102 of product conveying means 56 during vertical reciprocation of the latter.

Mechanically actuated means is provided in association with a pair of the shelves 22 for effecting alternate dispensing of products therefrom, although only a single selector button is provided for the two shelves. By virtue of this arrangement, the owner of the machine has improved control over the two shelves for a favored product and other products cannot be placed thereon, since the mechanism will effect automatic alternate delivery of products from the shelves. For purposes of illustration, the release mechanisms 146 in association with shelves 22c and 22d as shown in FIG. 1, have mechanism broadly designated 188 associated therewith for causing alternate energization of the solenoids 172 of the release mechanisms, and consequent alternate swinging of table 34 cooperable therewith.

Mechanism 188 may conveniently include a master plate 190 pivotally mounted on main panel portion 24c of main frame member 24 between the mechanisms 146 associated with shelves 22c and 22d, and having an upper integral extension 190a thereon positioned to engage the tab 154 of the upper latch 156, and a lower extension 190b located to engage the tabe 154 of the lower latch 156 as evident in FIG. 1. A bracket 194 fixed to main frame member 24 carries pivot structure 192 for pivotal movement relative thereto and is provided with an integral indentation 196 formed therein in disposition to cooperate with tab 198 on the upper extremity of plate 190, as shown in FIGS. 1 and 12. It is to be understood that the plate 190 is located so that the same may swing about the pivot structure 192 therefor to bring the extensions 190a and 190b into alternate abutting relationship to the tabs 154 of the upper and lower latches 156. Switch 200 carried by plate 194 has an actuator 202 which is positioned to be operated by tab 204 on main plate 190. Coil spring 206 (FIG. 12) urges the plate 190 toward bracket 194, but permits pivoting of the upper extremity of plate 190 away from bracket 194 to an extent to permit the tab 198 to slide over the indentation 196 during oscillation of plate 190. It is also to be pointed out that when the extension 190a is in engagement with the tab 154 of the upper latch 156, the tab 204 is out of engagement with the switch actuator 202, while when the extension 190b is in engagement with the tab 154 of the lower latch 156, the tab 204 will be in engagement with actuator 202 in disposition to effect a change in the contacts of switch 200.

Figure 6:
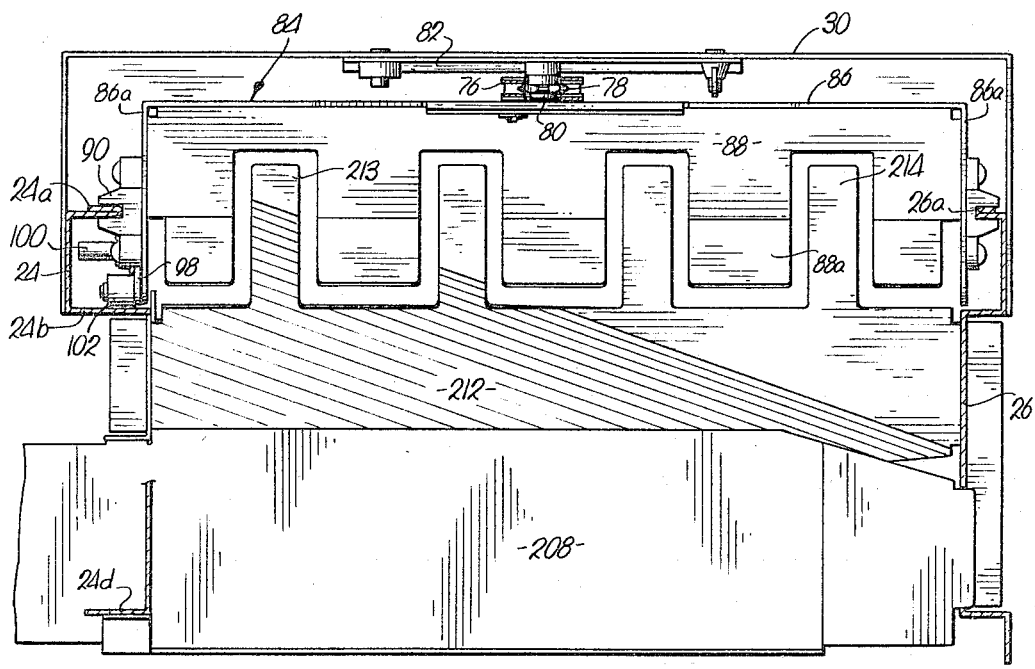
FIG. 6 is a fragmentary horizontal cross-sectional view through the product conveyor and the structure for stripping a product from the conveyor as the same moves toward the discharge area, and taken substantially on the line 6—6 of FIG. 2 and also looking downwardly in the direction of the arrows.

With reference to FIGS. 2 and 6, it can be seen that the inclined delivery chute 208 adjacent the lower extremities of frame members 24 and 26 and to one side of the conveyor chain 76, is disposed to direct products received thereon to a discharge area defined in part by plate 210 which is accessible to a customer. Panel 212 joined to inclined delivery chute 208 on the side thereof underlying product conveying means 56, is transversely inclined and has a series of projecting fingers 213 thereon which are located to clear the fingers 88a of plate member 88 during vertical reciprocation of the latter. Thus, during lowering of a product by conveying means 56, passage of the fingers 88a through the fingers 213 causes the product to be displaced from the conveyor and transferred onto panel 212 for rolling motion onto the delivery chute 208 and ultimate gravitation to the discharge plate 210.

Sold-out sensing means for the shelves 22 to deactivate the release mechanism 146 associated with a respective shelf from which a product has been sold out, or for completely deactivating the machine when all shelves have been depleted of products, conveniently takes the form of a generally L-shaped sensing blade 214 for each of the shelves 22 and each pivotally mounted on the leg 24d of main frame member 24 so that the blade section 214a thereof projects in overlying relationship to the associated channel 32 and table 34. The leg 214b of each blade 214 is disposed to engage the actuator of a corresponding sold-out switch 216 which is carried by a bracket 218 therefor on main frame member 24. A generally U-shaped rod 220 is pivotally carried by suitable brackets 222 at the upper and lower extremities of main frame member 24, adjacent sold-out sensing blades 214, in disposition such that the rod 220 is rotated against the bias of spring blade 224 thereon, when one or more of the blades 214 are maintained in disposition sensing the presence of a product on a respective shelf, to thereby maintain rod 220 out of engagement with the actuator 225 of total sold-out sensing switch 227.

In the simplified wiring diagram illustrated in FIG. 13, one power terminal 226 is joined to the switch blade 228 of vend switch 230 while the contact 232 of such switch is coupled to the switch blade 234 of switch 136 by a line 236. The other contact 238 of vend switch 230 is joined to the coil 240 of credit relay 242 by a line 244. Switch blade 246 of credit relay 242 is coupled to power line 248 between terminal 226 and vend switch 230, by a line 250 while another line 252 couples line 250 directly to the switch blade 254 of credit relay 242. Line 256 joins contact 258 of relay 242 to line 244. The second switch blade 260 of credit relay 242 is coupled by line 262 to the coil of solenoid 120 while the other side of the coil is coupled by line 264 to a line 266 joining motor 60 to the other power terminal 268. The other side of motor 60 is joined to contact 270 of switch 136 by line 272 while another line 274 couples line 272 to the coil 240 of credit relay 242. The second contact 276 of sensing switch 136 is coupled to the switch blade 278 of total sold-out switch 227 by line 280. The normally closed contact 282 of switch 227 is joined by line 284 to the fourth switch blade 286 of credit relay 242. As previously noted, sold-out switches are provided for each of the shelves 22, except for those shelves associated with release mechanism adapted to effect either alternate vending of products from alternate shelves, or successive vending of products from a number of shelves. For this reason, a sold-out switch 216a is illustrated associated with the shelf 22b for example, a second sold-out switch 216b is indicated in association with the two mechanically coupled shelves 22c and 22d adapted to effect vend of products from alternate shelves, and a third sold-out switch 216c is illustrated in association with the solenoids 172 of three different shelves 22 which are operably connected with suitable stepper mechanism capable of causing products to be vended from successive shelves upon successive operation of the push-button control therefor. Thus, the representative circuit shows the normally open contact 288 of sold-out switch 216a coupled to sold-out light 290 by line 292 while the other side of light 290 is joined to line 266 by line 294. The normally closed contact 296 of sold-out switch 216a is coupled by line 298 to the associated solenoid 172a which in turn is joined by line 300 to the normally open contact 302 of push-button control switch 304 provided on the face of the vending machine cabinet. The normally open contact 306 of sold-out switch 216b is joined by line 308 to a second sold-out lamp 310 while the other side of such lamp is coupled to line 266 by line 312. The normally closed contact 314 of sold-out switch 216b is coupled by line 318 to the switch blade 320 of switch 200 while the normally open contact 322 of switch 200 is coupled by line 324 to the solenoid 172b associated with shelf 22c. The normally closed contact 326 of switch 200 is joined by line 328 to the solenoid 172c associated with shelf 22d while line 330 and 332 couple solenoids 172b and 172c to the normally open contact 334 of a push-button switch 336 which is associated with both of the shelves 22c and 22d for alternate vending of products therefrom. The normally open contact 338 of the sold-out switch 216c operably associated with solenoids 172d, 172e and 172f, is joined by line 340 to a third sold-out lamp 342 in turn coupled by line 344 to line 266. The normally closed contact 346 of sold-out switch 216c is joined by lines 348 and 350 to the coils of solenoids 172d, 172e and 172f respectively. The other side of each of the above coils is coupled by lines 352, 354 and 356 to the normally open contacts 358, 360 and 362 of a stepper 366 illustrated only schematically in FIG. 13, but which may desirably be of the rotary stepper type. The switch blades 368, 370 and 372 of sold-out switches 216a, 216b and 216c respectively, are coupled by corresponding lines 374, 376 and 378 to line 280.

The switch blade 380 of stepper 366 is joined by line 382 to the normally open contact 384 of push-button switch assembly 386 on the panel of the vending machine cabinet and operably associated with the three solenoids 172d, 172e and 172f. The switch blades 381 and 383 of stepper 366 are coupled by lines 385 and 387 to line 382.

Although the push-button structure 386 has been shown in association with only three control solenoids 172, this number can be varied as desired by simply wiring of additional contacts of stepper 366 to corresponding solenoids 172 associated with product shelves 22. It is also to be noted that the sold-out lamps 290, 310 and 342 are mounted on the panel of the vending machine cabinet adjacent push buttons 304, 336 and 386 so that the customer will be made aware of a sold-out condition of a particular product at the time he makes his selection.

The switch blade 388 of push button switch assembly 304 is coupled by line 390 to the normally closed contact 392 of switch 336, while the switch blade 394 of this latter switch is joined by line 396 to the normally closed contact 398 of the uppermost switch of assembly 386. The switch blade 400 movable between contacts 384 and 398 is coupled through the provision of line 402 to the normally open contact 404 of the second switch of credit relay 242. Line 406 serves to join the normally open contact 408 of the lower switch of assembly 386 to the normally open contact 410 of the third switch of credit relay 242. Line 412 couples the lower switch blade 414 of switch assembly 386 to the coil 416 of stepper 366, while line 418 joins coil 416 to line 266. The coil of coin return electromagnet 420 forming a part of the coin accepting mechanism of the vending machine, is joined by line 422 to the normally closed contact 424 of the fourth switch of credit relay 242, and line 426 couples the other side of the coin return electromagnet 420 to line 266.

In describing the operation of product support and release mechanism 20, it is initially assumed that all of the shelves 22 are filled with products to be vended and that the sold out-sensing blades 214 are thereby in disposition causing switch blades 368, 370 and 372 to be in the locations of the same illustrated in FIG. 13. Similarly, the switch blade 278 of total sold-out switch 227 is located in engagement with contact 282 as shown. Furthermore, it is initially assumed that all of the components are in the standby position of the same as illustrated in FIG. 1.

Although not forming a part of the invention and therefore not illustrated, it is to be understood that coin control mechanism is provided in association with the control circuit illustrated in FIG. 13 and preferably of the type permitting vending of products at different prices and with change being returned to the customer for deposits in excess of the sales price of a particular selected product. It is for this reason that a coin return electromagnet 420 has been shown in the schematic circuit, and which is of the conventional type for blocking insertion of additional deposits in the vending machine during the vending cycle. As will be explained, the coil of coin return electromagnet 420 is deenergized during the vend cycle as well as when all selections are sold out and therefore blocking fingers are moved into the path of coins deposited in the machine to preclude loss of customer deposit without obtaining a product therefor.

If the customer first selects a product on one of the shelves 22a or 22b for example, and corresponding to the pushbutton selector switch 304, delivery of a product to the customer is accomplished in the following manner. For the purpose of this description, it is assumed that the product is selected from the uppermost shelf 22a that the push-button selector switch 304 corresponds to this shelf. Accordingly, upon depression of the push button associated with the switch 304, the switch blade 388 is shifted into engagement with contact 302 thereby completing a circuit to solenoid 172a. Before a customer may receive a product, proper monetary deposit must be made in the machine. In the simplified circuit illustrated, it is assumed that proper deposit has been made, whereupon the switch blade 288 will be momentarily depressed to thereby energize the coil 240 of credit relay 242 and set up a holding circuit for such coil. Initial energization of the relay is effected between terminals 226 and 268 by a path including line 248, switch blade 228 of vend or coin switch 230, line 244, coil 240 of relay 242, line 274, line 272 and line 266. Change of the switch blades of relay 242 establishes a holding circuit for circuit relay 242 through the line 250, switch blade 246, contact 258 and line 256 coupled to line 244. Thus the credit relay remains energized when the coin switch blade 228 returns to the normal position thereof in engagement with contact 232.

When the customer depresses the push button associated with selector switch 304, switch blade 388 is moved into engagement with contact 302 whereby the solenoid 172 is energized through a circuit including terminal 226, line 248, switch blade 228 of coin switch 230, contact 232, line 236, switch blade 234 of control switch 136, line 280, line 374, switch blade 368 of sold-out switch 216a, contact 296, line 298, the coil of solenoid 172a, line 300, contact 302, switch blade 388 of switch 304, line 390, switch blade 394 of the selector switch 336, line 396, contact 398 of the selector switch assembly 386, switch blade 400, line 402, contact 404, the second switch blade 260 of credit relay 242, line 262, solenoid 120, line 264 and line 266 leading to terminal 268. It is to be noted at this juncture that the solenoid 120 is in series with the selected solenoid 172a, and therefore both solenoids are energized simultaneously as the voltage is divided therebetween.

Energization of the solenoid 172a causes the armature 174 thereof to be retracted and effecting swinging of operating member 178 inwardly against the bias of spring 180 thereon, as the enlarged head 176 of the solenoid bears against the outer face of member 178. The outer leg portion 178a of the operating member is thus moved into alignment with the vertical segment of the corresponding L-shaped opening 184, and is maintained in such disposition by the associated retainer 128, notwithstanding deenergization of solenoid 172a as switch blade 234 transfers from contact 276 to contact 270 when switch 136 is operated.

Returning to the control mechanism 106 which is also actuated simultaneously with operation of the selected release mechanism 146, it is to be appreciated that upon energization of the solenoid 120, the armature 122 thereof is retracted causing the head 124 to bear against operating member 126 and swing the latter inwardly against the bias of the spring pressure thereon. Inward movement of operating member 126 brings the leg portion 126a thereof into alignment with the vertical section of opening 116 and with operating member 126 being maintained in the actuated position thereof by the associated retainer 128, notwithstanding deenergization of solenoid 120 by switch 136.

Inward movement of operating member 126 causes the plate 132 thereon to engage the actuator 134 of sensing switch 136 whereby the switch blade 234 thereof is shifted out of engagement with contact 276 and into engagement with contact 270. The change of condition of switch 136 has several effects. First, the elevator motor 60 is energized along a path between terminals 226 and 268 through the circuit of line 248, switch blade 228 of coin switch 230, contact 232, line 236, switch blade 234 of switch 136, contact 270, line 272, the field windings of motor 60, and line 266 leading to terminal 268. Secondly, as earlier mentioned the solenoids 120 and 172a are deenergized upon operation of switch 136. At the same time, the credit relay is deenergized by virtue of the fact that both sides of coil 240 are now at the same potential. However, the motor 60 continues to operate so long as switch blade 234 is maintained in engagement with contact 270. Energization of motor 60 causes the product conveying means 56 to be lowered as spur gear 62 and spur gear 70 are rotated in directions to move sprocket 74 in a direction to shift the elevator downwardly as pin 96 rides in the slot 92 in member 86 of the elevator 84. Immediately upon commencement of movement of the elevator 84, control mechanism 106 commences to rotate about the axis of pivot structure 110 and under the influence of spring 144. During such downward movement of the elevator and resulting rotation of control mechanism 106, the outer leg portion 126a of operating member 126 moves down into the narrow vertical section of opening 116 whereby the operating member 126 is retained in the actuated position thereof, thus maintaining switch blade 234 in engagement with contact 270.

When the roller 102 on arm 98 carried by elevator 84, reaches the leg portion 178a of operating member 178, which has been shifted into the path of travel of such roller, the operating member 178 is rotated about the axis of the associated shaft 38 thereby causing plate 160 to rotate therewith. Pivoting of the plate 160 about the axis of shaft 38 causes the cam surface 160a to operate against the tab 154 of the corresponding latch 156 and thereby cam such tab out of locking engagement with the cutout 152 of the respective plate 150. The cam surface 160a has completely shifted the latch 156 of engagement with the plate 150 by the time tab 154 moves into engagement with the upper edge of plate 150 defining the top margin of the aperture 166 therein. Accordingly, continued rotation of plate 160 causes the plate 150 to be rotated therewith, and effecting tilting of the corresponding table 34 by virtue of the square shaft connection of plate 150 to shaft 38 underlying the associated table.

Viewing FIGS. 3 and 4, it can be seen that as the uppermost table 34 is tilted, the leg portion 34a thereof moves upwardly while the leg portion 34b of the same moves downwardly into a position whereby the lowermost product 36a may gravitate onto the plate member 88 of elevator 84 as the same passes by the tilted table 34.

During tilting of the table 34, the rods 52 and 54 are shifted to provide a clamshell release of the product as previously described, in view of the fact that the rod 54 is shifted into blocking relationship to the next to lowermost product 36b as the forward rod 52 moves upwardly into a position clearing the lowermost product 36a. Swinging movement of the rods 52 and 54 during rotation of table 34 is effected by the link 46 therebetween. It is to be especially noted in this respect that the leg portion 34a of table 34 cooperates with the rearmost rod 54 to provide a gate precluding further movement of product 36b into a position to be vended, and also precludes jackpotting of the machine in any way should a customer seek to reach into the cabinet of the machine and dislodge a product from a corresponding shelf. The table 34 which has been tilted remains in such position as the elevator 84 continues its downward movement with the product 36a thereon.

When the elevator 84 reaches the vicinity of the product discharge chute, the fingers 88a of plate member 88 pass between fingers 213 whereby the product is displaced from elevator 84 and rolls onto the product delivery chute 208 for gravitation to a plate 210 where the customer may readily grasp the article and remove the same from the vending machine cabinet.

As the motor 60 continues operation, the pin on the link chain belt 76 riding in slot 92 moves around sprocket 78 and thence upwardly; the elevator 84 follows along therewith toward the uppermost standby position of the same. When the roller 102 reaches the level of the actuated release mechanism 146 as shown in FIG. 3, the roller reengages the leg portion 178a of operating member 178 and restores the release mechanism 146 to the initial disposition of the same and also returns the associated retainer 128 to the standby position thereof on top of the proximal operating member 178, since the latter moves under the inturned leg of the retainer 128 when the operative member moves down into the narrow portion of opening 184. It is to be noted at this juncture that during downward movement of the elevator 84 and engagement of roller 102 with the actuated release mechanism 146, the roller 102 forces the operating member 178 downwardly until the leg portion 178a thereof engages the bottom of the L-shaped opening 116, whereupon the roller 102 then follows around the contour of the leg portion 178a of operating member 178, as arm 98 swings about its axis of rotation against the bias of spring 104. Similarly, when the roller 102 is moved upwardly it engages the leg portion 178a and restores it to normal condition whereupon the roller 102 may again pass around the leg portion 178a of operating member 178 to return to the uppermost disposition of the same.

After the elevator 84 has restored the actuated release mechanism 146 to standby position, the control mechanism 106 is returned to standby by engagement of pin 100 with the lower edge of leg portion 114a of plate 114. As soon as the operating member 126 clears the lower narrow section of opening 116, the operating member is swung outwardly by the spring bias thereon, thereby permitting the switch actuator 134 to move and cutting off the power to motor 60 as soon as switch blade 234 moves out of engagement with contact 270 and returns to its normal position in engagement with contact 276. The machine is now in condition for another vend cycle. However, during the product dispensing cycle previously described, the coin return electromagnet 420 remains deenergized precluding additional deposit in the machine since during the period of energization of relay 242, the circuit to coil 420 is open so long as switch blade 286 of the fourth switch of relay 242 is out of engagement with contact 424, and the coin return electromagnet remains deenergized even though the credit relay returns to normal deenergized condition, by virtue of the fact that coin return electromagnet 420 is in the circuit of switch 136 and remains deenergized while switch blade 234 is in engagement with contact 270. The series circuit relationship of total sold-out switch 227 and coin return electromagnet 420 serves to preclude energization of credit relay 242 and immediate return of deposited money to the customer, when all of the shelves are in a sold-out condition.

Vending of products from the shelves 22c and 22d is accomplished in the same manner described above with the exception of alternate energization of the control solenoids 172b and 172c. Thus it can be seen that upon initial operation by a customer, assuming proper monetary deposit in the machine, of the push button associated with switch 336, the solenoid 172c will be energized as illustrated in the circuit of FIG. 13, with the switch blade 320 of switch 200 in engagement with contact 326. Upon energization of solenoid 172c, and which it is assumed corresponds to the release mechanism 146 associated with shelf 22c, the release mechanism is ultimately rotated by the conveyor 84 whereupon the plate 190 is rotated by the cam surface on plate 150 into disposition with the extension 190a thereon in proximal relationship to the tab 154 of the latch 156 associated with shelf 22d. During such rotation of plate 190, the tab thereon moves to the other side of depression 196 thereby retaining plate 190 in the actuated position, and effecting a change in condition of the contacts of switch 200, as the tab 204 moves into engagement with the switch actuator 202. In this manner, the switch blade 320 is thereby shifted into engagement with the contact 322 and permitting energization of solenoid 172b upon the next depression of the push button associated with selector switch 336. In this manner, products will be alternately vended from shelves 22c and 22d by virtue of alternate energization of solenoids 172b and 172c.

The present mechanism is also well adapted for electrical selectivity of product vending so that if desired, a machine may be set up to have two or more shelves operable to successively vend products from successive shelves in response to customer operation of the selector switch assembly 386.

For purposes of the description of this machine, it is assumed that successive energization of the coil 416 of stepper 366, successively moves the switch blades 380, 381 and 383 into engagement with the contacts 358, 360 and 362 respectively. Accordingly, the solenoids 172d, 172e and 172f will be successively energized upon operation of selector switch 386 by a customer and after proper monetary deposit in the machine. Power is applied to the solenoids 172d, 172e and 172f through respective control switches therefor of stepper 366, through the second switch of credit relay 242 upon energization of the latter. The coil 416 of stepper 366 is energized through the third switch of credit relay 242.

It is also to be noted that the selector switches are in series to preclude operation of more than one switch at a time and preclude dispensing of more than one product for each deposit. It is of course, recognized that various types of conventional control mechanisms of both the mechanical and electrical type, may be provided to assure that only one of the solenoids 172 is energized at a time.

Modified product support structure usable in connection with product support release mechanism 20, is illustrated in FIGS. 14 to 17 inclusive of the drawings, and which is especially suited for dispensing of canned beverages or the like from shelves located in side-by-side relationship, although the products are released from alternate, horizontally aligned support shelves upon successive actuation of the release mechanism 146 associated therewith. Thus, in FIG. 14, one of the modified product support assemblies broadly designated 432 has been substituted for a product support 22 shown in the preceding drawings. The assembly 432, with one of the latter being substituted for each shelf 22 from which it is desired to dispense products in tandem rather than with a single line of products on the shelf, is designed to fit directly on the corresponding channel 32 as previously described. In addition, the assembly 432 is completely compatible with the associated release mechanism 146 and the tiltable table 34 cooperable therewith.

Figure 15:
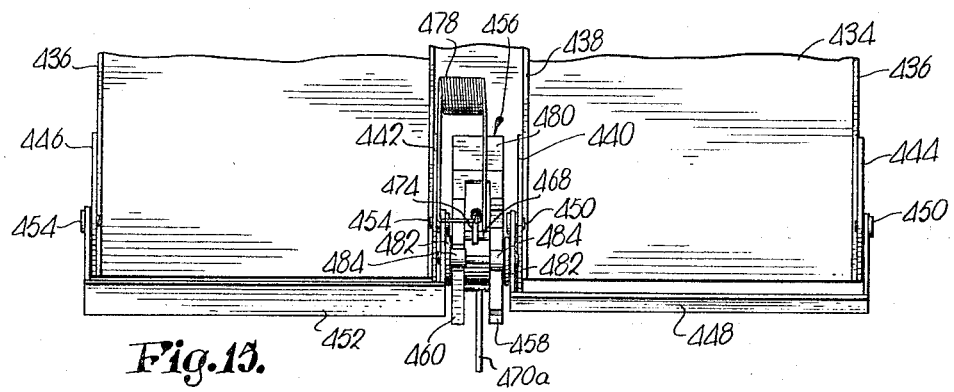
FIG. 15 is a fragmentary plan view of the can support shelves and associated ratchet release mechanism only, as illustrated in FIG. 14.

Referring to FIG. 15, it can be seen that the assembly 432 includes a transversely U-shaped platform 434 having upstanding flanges 436 at the side margins thereof extending longitudinally of the platform, and divided by a centrally disposed channel 438 parallel with flanges 436 and intermediate the latter. A pair of parallel, spaced, aligned plates 440 and 442 extending upwardly from the flanges of channel 438 adjacent the forwardmost edge of platform 434, are aligned with similar plates 444 and 446 projecting upwardly from the flanges 436 adjacent the forwardmost extremities thereof. The plates 440 and 444 cooperate to carry a generally U-shaped control release member 448 rotatable about pivot pins 450 therefor carried by the upper extremities of plates 440 and 444. In a similar manner, a generally U-shaped control release bar 452 is mounted on the upper extremities of plates 442 and 446 by pivot pins 454. Ratchet mechanism 456 for raising the member 448 as the member 452 is lowered and vice versa, is carried within channel 438 between plates 440 and 442. The ratchet mechanism 456 includes a pair of ratchets 458 and 460 carried by shaft 462 spanning the distance between plates 440 and 442. The ratchets 458 and 460 each have three leg sections 458a and 460a respectively which are located substantially at a tangent with respect to the main circular portion of each ratchet, and provided with an indentation 458b and 460b respectively in the outer extremities thereof. A hub 464 on shaft 462 between ratchets 458 and 460 maintains the same in predetermined spatial relationship, while projections 466 of respective walls 440 and 442 provide clearance for the ends of shaft 462 to preclude catching of a product thereon and also define spacers on opposed surfaces of plates 440 and 442 to maintain the ratchets away from the side walls of the plates.

Figure 14:
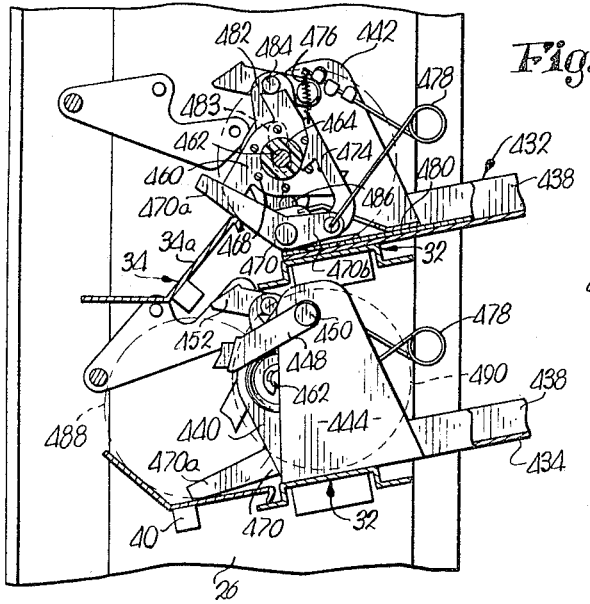
FIG. 14 is a fragmentary vertical cross-section view similar to FIG. 4, but illustrating a modified form of the present invention involving a pair of side-by-side support shelves especially adapted for canned beverages, and showing ratchet mechanism in association therewith for alternate release of products to the associated tiltable release tables.

Mechanism for rotating the ratchets 458 and 460 in a clockwise direction viewing FIG. 14, includes a generally L-shaped operating lever 470 pivotally carried by a bracket 472 adjacent the forwardmost edge of channel 438. Lever 470 has an outer leg portion 470a disposed to be engaged and swung by the associated table 34 during rotation of the latter as previously described, as well as a rear leg 470b located between ratchets 458 and 460. The rearmost extremity of leg 470b of lever 470 is pivotally coupled to a pawl 474 having a hook portion disposed to engage a series of pins 468 disposed between ratchets 458 and 460 and surrounding hub 464. Spring 476 coupled to the upper end of pawl 474 as well as to suitable supporting means therefor on plate 442, biases the hook portion of pawl 474 toward pins 468. Spring 478 joined to plate 442 and to the lever 470 at the point of pivotal connection of leg 470b thereof to pawl 474, biases the lever in a counterclockwise direction viewing FIG. 17, thereby causing the lever and pawl assembly to maintain the normal positions of the same shown in such figure. An anti-backup pawl 480 on channel 438 rearwardly of ratchets 458 and 460, has leg segments projecting forwardly therefrom as best shown in FIGS. 14 and 15, for engagement with legs 458a and 460a to preclude counterclockwise rotation of the ratchets 458 and 460.

An operating link 482 secured to each of the inwardly bent legs of release members 448 and 452 within the space between plates 440 and 442, are pivotally mounted on corresponding members 448 and 452 forwardly of the pivot points 450 and 454 therefor. Each of the links 482 are provided with elongated slots 483 intermediate the ends thereof and receiving shaft 462 to thereby permit shifting of the links relative to such shaft as the links are pivoted about the axis thereof. The upper and lower pins 484 and 486 mounted on each of the links 482 adjacent opposed ends thereof, are of sufficient length to project over the leg portions 458a and 460a of ratchets 458 and 460 respectively.

Figure 16:
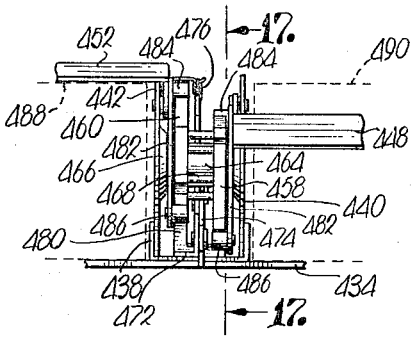
FIG. 16 is a fragmentary front elevational view of the structure illustrated in FIG. 15.

In describing the operation of the assembly 432 illustrated in FIGS. 14 to 17 inclusive, it is assumed that the member 448 is initially in a down position as shown in FIG. 16, while the member 452 is up thereby having permitted a product 488 to have rolled forwardly along platform 434 into a position on the associated table 34 as indicated by the lower table position of FIG. 14. By the same token, the release member 448 is shown in blocking relationship to a product 490 also located on platform 434. However, the rows of products are maintained in spaced relationship by the channel 438, but may roll freely toward release members 448 and 452 by virtue of the inclination of the platform 434 with respect to the horizontal as shown in FIG. 14.

Figure 17:
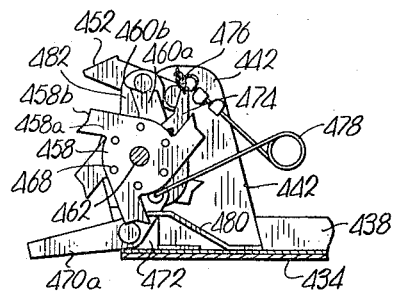
FIG. 17 is a fragmentary vertical cross-sectional view taken substantially on the line 17—17 of FIG. 16 and looking in the direction of the arrows.

Upon actuation of a selector button by the customer and consequent operation of control mechanism 106 and an associated release mechanism 146 (in this case assumed to be the release mechanism of the lower shelf of FIG. 14 and also shown in FIG. 17) the table 34 is tilted whereby the rearmost leg portion 34a thereof engages the lever 470 to rotate the latter in a clockwise direction against the bias of spring 478. During such movement of lever 470, the pawl 474 is pulled downwardly to rotate the ratchets 458 and 460 in a clockwise direction. Thus, the pin 484 on the link 482 associated with ratchet 460 as shown in FIG. 14, is caused to move off of the leg 460a initially supporting the same while the leg 460a projecting to the right of the ratchet 460 at the lowermost portion thereof as shown in FIG. 14, cams the pin 486 and associated link 482 downwardly until the lower pin 486 moves into the depression of the lower leg 460a. In this manner, the release member 452 is forced downwardly and locked by the associated ratchet leg 460a overlying the pin 468 while the release member 448 is moved upwardly by the action of ratchet 458 whereby the uppermost leg portion 458a engages the upper pin 484 of an associated link 482 to bias the latter upwardly as the lower pin 486 is released and permitted to slide along the cam surface of the lower leg 458a. This reverse movement of release members 448 and 452 is accomplished by virtue of the offset relationship of the legs of ratchets 458 and 460 as is best evident from FIG. 17. Therefore, upon successive rotation of the associated table 34, release members 448 and 452 will be alternately raised and lowered to thereby alternately release products 488 and 490 to a customer.

One particularly important advantage of structure such as assembly 432 is the fact that if desired, this mechanism may be intermixed with the conventional shelves 22 so that both canned and bottled beverages for example, may be vended from the same machine without substantial modification thereof. In addition, a machine which has been set up to vend cans or bottles, may be conveniently altered by simple removal of product support shelves and replacement of the same with either one of the assemblies 432, or a support shelf 22.

Having thus described the invention, what is claimed as new and desired to be secured by Letters Patent is:

1. In a product dispensing machine,
 a plurality of product supports;
 releasable means operably associated with each support for permitting release of a product from the support therefor upon actuation of a respective releasable means;
 selectively actuatable means coupled to said releasable means for controlling actuation of the latter and operable to permit actuation of only one releasable means at a time; and product conveying means movable along a path traversing the supports and operable to actuate a selected releasable means and thereafter receive a product from the support corresponding to a releasable means which has been actuated by the conveying means and to convey the product to a discharge area.

2. A machine as set forth in claim 1 wherein is provided a plurality of selectively actuatable apparatuses each associated with a different releasable means to permit customer selection of a product from more than one of said supports.

3. A machine as set forth in claim 1 wherein is provided control means operably associated with said selectively actuatable means, the releasable means and said product conveying means for effecting movement of the latter only after operation of said control means.

4. A machine as set forth in claim 1 wherein is provided means carrying the supports in vertically spaced relationship with each disposed to receive a series of individual products thereon for gravitational movement of the products toward a respective releasable means upon serial release of products from the corresponding support, and structure supporting said conveying means for movement along an upright path while traversing the supports.

5. A machine as set forth in claim 4 wherein each of said releasable means includes at least one shiftable member normally blocking gravitational movement of the lowermost product on the respective support into the path of said product conveying means, and a component movable into the path of said product conveying means for operation thereby upon actuation of the respective releasable means and operably connected to a corresponding shiftable member for shifting the latter into product clearing disposition in response to engagement of the product conveying means with said component, and said conveying means includes platform means disposed to receive and convey a product released from one of said supports.

6. A machine as set forth in claim 1 wherein said conveying means and each of the releasable means are provided with mutually interengageable mechanism for effecting release of a product from a support corresponding to a releasable means which has been selected and operable to effect pickup of the released product by the conveying means in response to and during movement of the latter toward said discharge area.

7. A machine as set forth in claim 6 wherein said mechanism includes a shiftable member normally blocking movement of a product on a respective support into disposition to be received on said conveying means during movement thereof, platform means on the conveying means for receiving a product thereon released from one of said supports, latch means for each of said members, and means on the conveying means engageable with said latch means during movement of the conveying means for releasing said latch means and shifting the member associated with the released latch means to effect release of a product from the support therefor to the platform means of the product conveying means.

8. A machine as set forth in claim 7 wherein is provided one actuating means for a pair of said releasable means, and means operably associated with said pair of releasable means for effecting alternate actuation thereof by said conveying means and in response to successive operation of said one actuating means.

9. A machine as set forth in claim 7 wherein each of said latching means includes a first rotatable plate connected to a respective product blocking member for permitting shifting of the member to release a product therefrom only upon rotation of said plate, a latch positioned to normally engage said first plate and preclude rotation thereof to effect release of a product by the member connected thereto, a second rotatable plate associated with said first plate and having cam means thereon positioned to engage said latch and connector means positioned to engage and rotate the first plate with the second plate when the latter has first rotated sufficiently to cause the cam surface thereon to engage and shift the latch out of locking engagement with the first plate, and coupling means actuated by said selectively actuatable means carried by said second plate and having an extension thereon movable into disposition to be engaged by said product conveying means during movement of the latter when the coupling means is operated whereby movement of the product conveying means into engagement with the extension of the actuated coupling means first effects rotation of the second plate to cam the latch out of locking engagement with the first plate and then effects rotation of the first plate to rotate the blocking member through an arc to release the product normally held thereby, to said product conveying means.

10. A machine as set forth in claim 9 wherein said product conveying means is provided with an element thereon operable to engage said extension and thereby effect rotation of said first plate as the latch is released therefrom, and then clear the extension as the product conveying means continues in the direction of movement thereof toward said discharge area, said element being disposed after clearing the extension to reengage the latter during movement of the product conveying means toward the standby position thereof, to return the extention to the initial disposition of the same and thereby restore the first and second plates associated therewith to their respective initial positions.

11. A machine as set forth in claim 10 wherein is provided holding means associated with each of said coupling means and comprising a generally L-shaped slot having a first leg normally receiving said extension of a respective coupling means and permitting movement of said extension therein as said coupling means is actuated and having a second leg disposed to receive said extension when said releasable means is rotated by engagement of said element on said product conveying means with said extension as said product conveying means moves toward said discharge area whereby said extension is thereafter held in position to be engaged by said element on said product conveying means as the latter returns to the normal position thereof.

12. A machine as set forth in claim 11 wherein is provided retainer means cooperable with each of said extensions for maintaining the latter in disposition to be shifted into said second leg of the slot associated therewith after movement of an extension into said disposition upon actuation of a respective coupling means whereby said extension is shifted into said second leg when it is engaged by said element on the product conveying means as the latter moves toward the discharge area.

13. A machine as set forth in claim 9 wherein is provided one actuating means for a pair of said releasable means, each of said releasable means including a solenoid operated by the actuating means coupled thereto for shifting the respective extension thereof into disposition to be operated by the product conveying means during movement of the same, switch means coupling said one actuating means to respective solenoids of said pair of releasable means for effecting alternate energization of said solenoids in response to successive operations of the switch means, and mechanical means operably associated with said pair of releasable means for changing the condition of the switch means as each releasable means is operated.

14. A machine as set forth in claim 1 wherein is included deposit operated control means for said selectively actuatable means, indicating means operably associated with each of said product supports for actuation by products thereon to indicate a sold-out condition of respective supports, and mechanically actuated means operated by said indicating means and coupled to said control means for precluding customer deposit when all of the indicating means have been operated to indicate a sold-out condition of all of the product supports.

15. In a dispensing machine for generally cylindrical products,
a plurality of vertically spaced, inclined platforms having product supports each disposed to receive a series of individual products thereon for rolling movement toward respective discharge extremities thereof, each pair of supports being located in side-by-side relationship and having adjacent lowermost discharge extremities;
primary releasable means operably associated with each platform and having shiftable product blocking components adjacent the discharge extremities of said supports and alternately movable into product blocking disposition for controlling release of products from alternate supports of each platform;
selectively actuatable means coupled to said releasable means for controlling shifting of said components into alternate positions thereof and operable to permit actuation of only one releasable means at a time;
product conveying means movable along a path traversing the platforms and operable to receive a product from the pair of supports coresponding to a releasable means which has been actuated and to convey the product to a discharge area; and
secondary releasable means operably associated with each platform and having shiftable elements operable by a corresponding primary releasable means upon actuation thereof for movement alternately into positions permitting sucessive delivery of products only from alternate supports of a respective platform into disposition to be released by the corresponding primary releasable means to said product conveying means.

16. A machine as set forth in claim 15 wherein each of said primary releasable means includes a shiftable table adapted to support a poduct thereon, said releasable means controlling shifting of the table to deliver the product to said product conveying means upon actuation of the respective releasable means and as the conveying means moves by the actuated releasable means, and each of said secondary releasable means includes a gate controlling delivery of products from each support of respective pairs thereof onto an associated table, and ratchet means coupled to gates adjacent each pair of side-by-side supports and operated by the table proximal thereto for effecting shifting of alternate gates into disposition releasing products thereby onto the associated table upon successive shifting of the respective table.

17. A machine as set forth in claim 16 wherein each of said ratchet means includes an arm projecting into the path of travel of an adjacent table during shifting thereof to release a product to said product conveying means, a pawl disposed to be shifted by said arm, a ratchet assembly common to the respective side-by-side supports for shifting the gates and including a series of equally spaced legs extending radially therefrom operable as said pawl is shifted to successively lift and retain the gate of alternate supports in disposition clearing a product on the associated support for gravitation toward the table.

18. A machine as set forth in claim 17 wherein half of said series of radial equally spaced legs are cooperable with one gate of a respective pair and the other half with the other gate and wherein the two groups of legs are offset both circumferentially and axially with respect to each other.

19. In a product dispensing machine,
a plurality of product supports;
releasable means operably associated with each support for permitting release of a product from the support therefor upon actuation of a respective releasable means;
selectively actuatable means coupled to said releasable means for controlling actuation of the latter and operable to permit actuation of only one releasable means at a time;
product conveying means movable along a path traversing the supports and operable to actuate a selected releasable means and thereafter receive a product from the support corresponding to a releasable means which has been actuated by the conveying means and to convey the product to a discharge area; and
means receiving the product conveying means during movement thereof toward said discharge area for stripping the product from said product conveying means and to effect direct transfer of said product to the discharge area.

20. A machine as set forth in claim 19 wherein said product conveying means has a series of spaced first fingers thereon for supporting the product, and said stripping means includes a series of spaced second fingers disposed to clear the first fingers during said movement of the product conveying means whereby the second fingers pick up and support the product as the fingers of the product conveying means move past the first fingers.

21. In a dispensing machine for generally cylindrical products,
a plurality of vertically spaced, inclined product supports having substantially aligned, lowermost product discharge extremities, said supports being disposed to store products thereon for rolling movement thereof toward said discharge extremities of respective supports;
product conveying means movable along an upright path traversing the supports, to a product discharge area;
releasable means adjacent the discharge extremity of each support and operable to release the lowermost product on the respective inclined support therefor and to deliver the released product to the path of travel of said conveying means for pickup thereby and conveyance by the conveying means to said discharge area; and
selectively actuatable means coupled to said releasable means for controlling actuation of the latter and operable to permit actuation of only one releasable means at a time.

References Cited

UNITED STATES PATENTS

| | | | |
|---|---|---|---|
| 2,376,561 | 5/1945 | Smith | 221—124 X |
| 2,735,578 | 2/1956 | Woodruff | 221—129 X |
| 2,858,042 | 10/1958 | Gabrielsen et al. | 221—238 X |
| 3,019,941 | 2/1962 | Gabrielsen et al. | 221—93 X |
| 3,040,928 | 6/1962 | Levine | 221—129 X |
| 3,187,760 | 6/1965 | Simjian | 221—93 X |
| 3,190,493 | 6/1965 | Johnson et al. | 221—129 X |
| 3,240,386 | 3/1966 | McCloy | 221—116 |

WALTER SOBIN, *Primary Examiner.*